(12) United States Patent
Hazan et al.

(10) Patent No.: US 11,370,120 B2
(45) Date of Patent: Jun. 28, 2022

(54) METHOD AND SYSTEM FOR TEACHING A ROBOT IN REACHING A GIVEN TARGET IN ROBOT MANUFACTURING

(71) Applicant: SIEMENS INDUSTRY SOFTWARE LTD., Tel Aviv (IL)

(72) Inventors: Moshe Hazan, Elad (IL); Zohar Bengad, Rehovot (IL); Gilles Velay, Garancieres (FR); Roni Blacher, Modeiin (IL); Yael Seror, Givat Shmuel (IL); Guy Barak, Rishon Le-Zion (IL); Yona Eilat, Kfar Saba (IL)

(73) Assignee: Siemens Industry Software Ltd., Tel Aviv (IL)

( * ) Notice: Subject to any disclaimer, the term of this patent is extended or adjusted under 35 U.S.C. 154(b) by 476 days.

(21) Appl. No.: 16/481,942

(22) PCT Filed: Jun. 8, 2018

(86) PCT No.: PCT/IB2018/000621
§ 371 (c)(1),
(2) Date: Jul. 30, 2019

(87) PCT Pub. No.: WO2018/229540
PCT Pub. Date: Dec. 20, 2018

(65) Prior Publication Data
US 2020/0246975 A1    Aug. 6, 2020

Related U.S. Application Data

(60) Provisional application No. 62/518,081, filed on Jun. 12, 2017.

(51) Int. Cl.
*B25J 9/16* (2006.01)
*B25J 9/00* (2006.01)
*G05B 19/425* (2006.01)

(52) U.S. Cl.
CPC ........... *B25J 9/1692* (2013.01); *B25J 9/0081* (2013.01); *B25J 9/1669* (2013.01); *G05B 19/425* (2013.01);
(Continued)

(58) Field of Classification Search
CPC ...... B25J 9/1692; B25J 9/0081; B25J 9/1669; B25J 9/1607; B25J 9/1643; B25J 9/1656;
(Continued)

(56) References Cited

U.S. PATENT DOCUMENTS 9,248,572 B2    2/2016 Ide et al.
2003/0171847 A1    9/2003 Cheng et al.
(Continued)

FOREIGN PATENT DOCUMENTS

CN    101823260 A    9/2010
CN    103995476 A    8/2014
(Continued)

OTHER PUBLICATIONS

Chiaverini, Stefano et al: "Kinematically Redundant Manipulators", Springer Handbook of Robotics (May 20, 2008) Springer, Germany, XP055066482, ISBN: 978-3-54-023957-4 pp. 245-268, DOI: 10.1007/978-3-540-30301-5_12.
(Continued)

*Primary Examiner* — Basil T. Jos
(74) *Attorney, Agent, or Firm* — Laurence A. Greenberg; Werner H. Stemer; Ralph E. Locher

(57) ABSTRACT

Systems and a method for teaching a robot in reaching a given target location. The system and method include receiving inputs on a representation of a given target location to be reached by the robot. A check is made whether the given target location is singular. If the given target location is non-singular, the teaching of the robot is effected by associating with the given target location a selected con-
(Continued)

figuration. If the given target is singular, the teaching of the robot is effected by associating with the given target location an assigned joint-values solution.

18 Claims, 4 Drawing Sheets

(52) U.S. Cl.
CPC .............. *G05B 2219/39048* (2013.01); *G05B 2219/39186* (2013.01); *G05B 2219/40279* (2013.01)

(58) Field of Classification Search
CPC ........ G05B 19/425; G05B 2219/39048; G05B 2219/39186; G05B 2219/40279; G05B 2219/40331; G05B 2219/40354; G05B 2219/40367
See application file for complete search history.

(56) References Cited

U.S. PATENT DOCUMENTS

| | | | |
|---|---|---|---|
| 2007/0112468 A1* | 5/2007 | Freeman | ................ B25J 9/1607 700/265 |
| 2015/0120059 A1 | 4/2015 | Ide et al. | |
| 2015/0261206 A1 | 9/2015 | Shiino et al. | |

FOREIGN PATENT DOCUMENTS

| | | |
|---|---|---|
| CN | 105382835 A | 3/2016 |
| DE | 102012022190 A1 | 5/2014 |
| JP | S591181 A | 1/1984 |
| JP | H02218569 A | 8/1990 |
| JP | 2005329521 A | 12/2005 |
| JP | 2010076058 A | 4/2010 |
| JP | 2010201592 A | 9/2010 |
| JP | 2015085427 A | 5/2015 |
| WO | 2014083695 A1 | 6/2014 |
| WO | 2017167687 A2 | 10/2017 |

OTHER PUBLICATIONS

Baillieul, John: "Kinematic programming alternatives for redundant manipulators", Proceedings, 1985 IEEE International Conference on Robotics and Automation, vol. 2, Mar. 25, 1985), pp. 722-728, XP05577880, DOI: 10.1109/ROBOT.1985.1087234, URL: http://dx.doi.org/10.1109/ROBOT.1985.1087234 [retrieved on Feb. 24, 2021].

Rakhodaei, Hamid: "Design and Analysis of a 9 DOF Hybrid Parallel Robot"; The University of Birmingham, School of Mechanical Engineering; Publication [online]. Oct. 2013 [retrieved Aug. 17, 2017). Retrieved from the Internet: <URL:http://etheses.bham.ac.uk/4668/1/Rakhodaei 13PhD.pdf>; pp. 1-100; 2013.

* cited by examiner

METHOD AND SYSTEM FOR TEACHING A ROBOT IN REACHING A GIVEN TARGET IN ROBOT MANUFACTURING

TECHNICAL FIELD

The present disclosure is directed, in general, to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems). More specifically, the disclosure is directed to production environment simulation.

BACKGROUND OF THE DISCLOSURE

A typical industrial robot has a plurality of joints (e.g. usually six or more joints) and at least one kinematic chain. Typically, in the robot kinematic chain, usually at its end, it is mounted an industrial tool for performing a robotic task on a target location usually located within a part to be machined. Examples of robotic tasks performed by tools include, but are not limited to, welding, spot welding, arc welding, painting, coating, drilling and riveting, laser cutting, hemming, and other types of manufacturing operation tasks performed by tools on parts. The end of the robot kinematic chain may also be known as Tool Center Point Frame ("TCPF") or Tool Center Point ("TCP"). When a tool is mounted on the robot kinematic chain, the TCPF is the end of the tool.

FIGS. 2 and 3 illustrate a schematic view of a robot 201 with six joints j1, j2, j3, j4, j5, j6. In FIGS. 2 and 3, the end 202 of the kinematic chain of the robot 201 is also the TCPF and it is positioned on the target location. In FIGS. 2 and 3, the part to be machined is not shown.

As used herein, the term "configuration" denotes a robot configuration. As known in the art, the robot configuration is defined by the arrangement of the robotic joints for the robot to reach the target location 202. The TCPF of the robot 201 can reach the target location 202 in a plurality of configurations.

In the field of robot programming, teaching techniques denote techniques for teaching a physical robot (e.g. via program downloading) or a virtual robot (e.g. via simulation) how to reach each robotic target location in replicable ways, for example by having the same TCPF and same values for each of the joints j1, . . . , j6.

For the tip of a robot tool, in order to reach a desired target location described in a Cartesian representation, an inverse kinematic calculation has to be performed in order to determine a set of possible solutions. Each solution of the set can be described as a series of joint values (e.g. jv1, jv2, jv3, jv4, jv5, jv6) that will drive the robotic tool tip to the target 202. For example, in FIG. 1, in window 203, it is shown a solution with joint values jv1, jv2, jv3, jv4, jv5, jv6 respectively equal to −80, 90, 0, 60, 0, 80.

Typically, in industrial robots, each of the found solutions via inverse kinematic calculation has a corresponding robot configuration, like for example elbow-up and elbow-down, that can be used to univocally define the solution in case of non-singularity.

For a "non-singular" target location, the number of possible solutions is finite. Usually, there is a finite set of possible configurations, with a one to one relationship between a calculated solution and its corresponding robot configuration.

Therefore, in case of a target location which is "non-singular", a given specific robot configuration determines one given specific solution which can be univocally found via inverse kinematic calculation.

A singular target location is theoretically defined as a target location where the inverse kinematic calculation returns an infinite number of solutions. In a pragmatic manner, a singular target location is herein defined as a location target where the inverse kinematic returns a plurality of solutions for at least one configuration.

In case of singularities, the fact that there might be a plurality of solutions, i.e. a plurality of joint value series, able to drive the robot to the target location implies that several of such solutions have the same robot configuration.

Hence, in case of targets with singularities, the typical robot teaching process through which a robot configuration is assigned becomes unfortunately quite problematic. In fact, it is not ensured that consistent and/or repetitive solutions will then operate the industrial robot at the shop floor, or at any off-line Computed Aided Robotics tool that is used for robotic program verification and validation, due to the fact that for one configuration there might be several possible alternative solutions.

Therefore, improved techniques are desirable.

SUMMARY OF THE DISCLOSURE

Various disclosed embodiments include methods and corresponding systems and computer readable mediums for teaching a robot in reaching a given target location. A method includes receiving information input on a representation of a given target location to be reached by the robot. The method includes checking if the given target location is singular. If the given target is non-singular, the method includes teaching the robot by associating to the given target location a selected configuration. If the given target location is singular, the method includes teaching the robot by associating to the given target an assigned joint-values solution.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
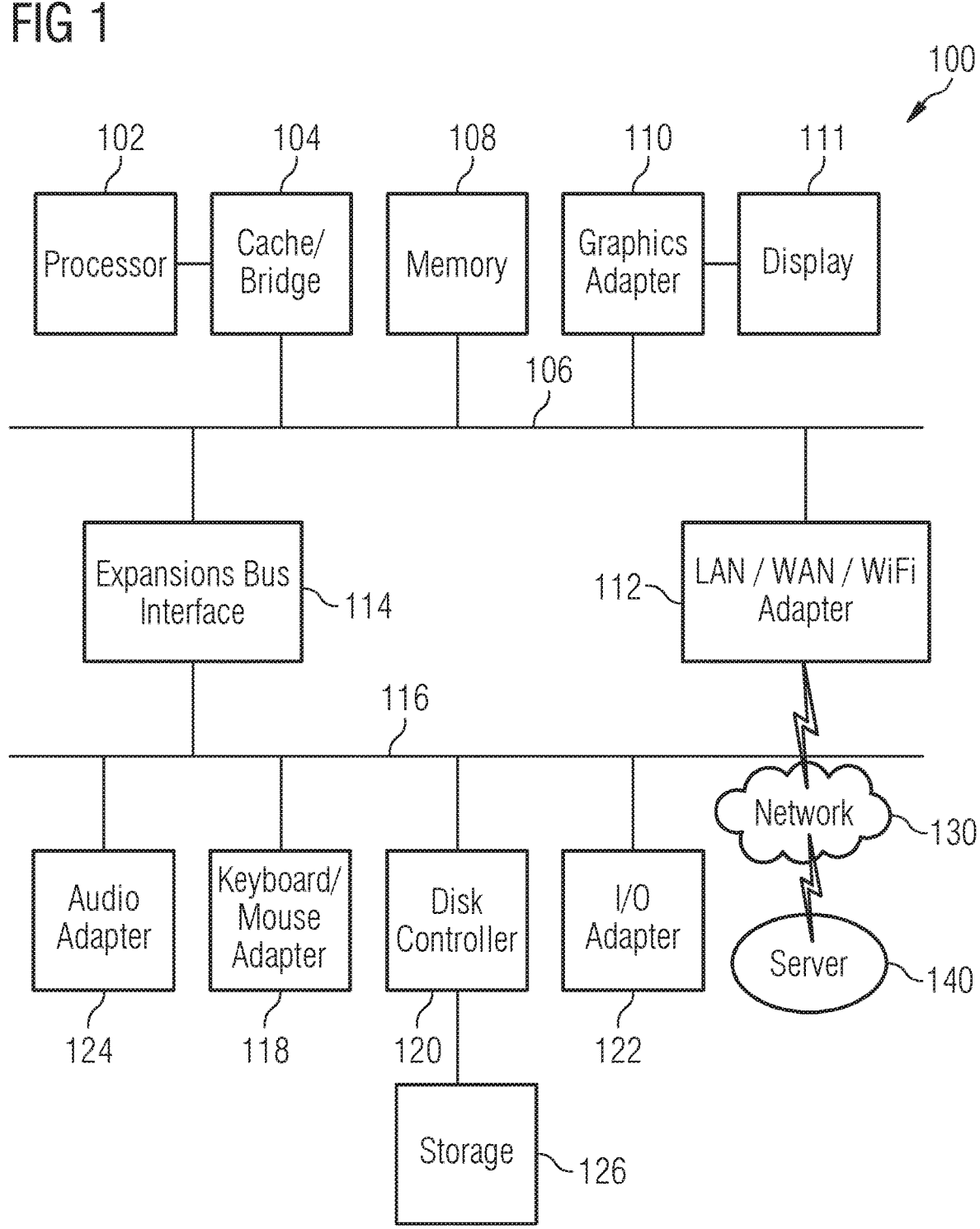
FIG. 1 illustrates a block diagram of a data processing system in which an embodiment can be implemented.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques for teaching a robot in reaching a given target in case of target singularities based on a manual "trial-and-error" approach are cumbersome, tedious, error-prone, and otherwise ill-suited for the task.

Previous techniques for teaching a robot in reaching a given target do not ensure a consistent solution for a robot with a singular target.

In prior art techniques, using singular targets in the robotic programs resulted in unexpected robot joint values for the target's solution, which lead to incorrect simulation results, or wrong values in the re downloaded robotic program.

In previous techniques, users often avoided using singular targets in physical or virtual robotic programs.

With embodiments, singular targets can be safely used in the virtual or physical robotic program planning.

With embodiments, there is a matching between the virtual and physical programs.

With embodiments, there is improved usability and flexibility, since the user is enabled to use singular targets in the robotic program.

With embodiments, there is improved predictability, since the joint values in the singular target's solution is the same.

With embodiments, there is improved accuracy due to predictability in which simulation results reflect the real robot behavior.

With embodiments, there is a user friendly approach, since the user does not need to handle singular targets in a different manner, but the software does it for him/her in an automatic way.

With embodiments, robotic simulation is rendered reliable and predictable in reflecting the reality.

With embodiments, user is provided with a high degree of flexibility in the task of planning the robotic simulation. Advantageously, the user is hence allowed to use targets for the robot that with previous techniques were rather avoided.

Embodiments enable to automatically identify the problematic singular robot joint values, and upload them into the offline simulation in such a way that the joint values of the robot at these targets are identical to the joint values of the original robotic program.

Embodiments enable to set a desired solution for singular robotic targets in offline simulation. This guaranties that the chosen solution for the singular targets is used whenever the inverse kinematics calculation is done on these targets. This contributes to a higher level of reliability of the offline simulation tools, and to the higher level of predictability of the related simulated results.

Embodiments enable to ensure that downloading a virtual program from the simulation environment generates an identical physical robotic program. Otherwise, with previous techniques, for one virtual program, several robotic programs may have resulted in case of singularities.

Embodiments enable to define a consistent solution for the singular targets in the virtual simulation environment, and downloading the program from the simulation to a physical program ensures that the solutions that were used during simulation are the ones that are written to the physical robotic program.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

EXAMPLE SCENARIO OF A WRIST SINGULARITY

Figure 2:
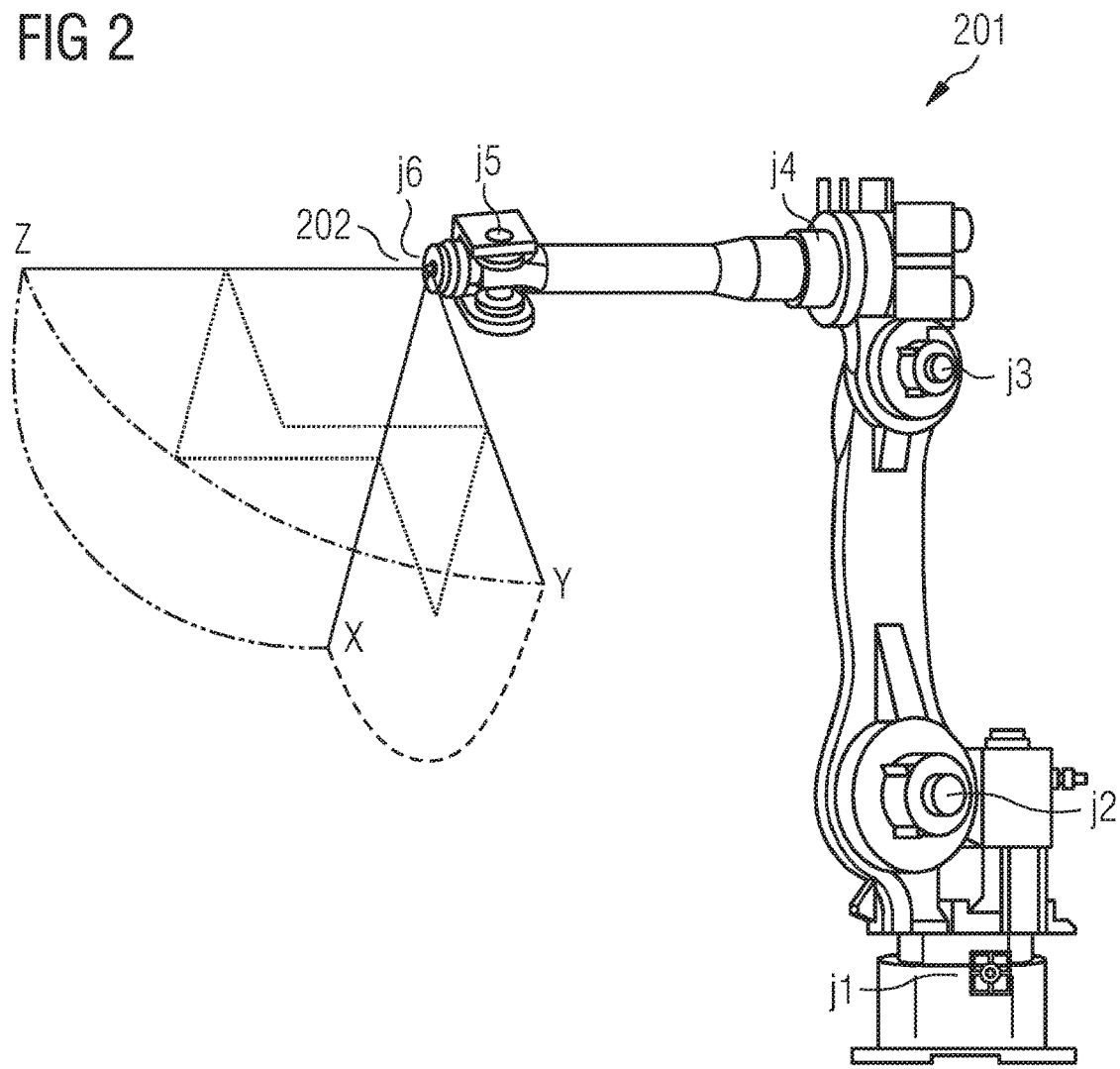
FIG. 2 schematically illustrates a drawing of a first exemplary case scenario of a robot with a singular target and a first joint value set.
Figure 2:
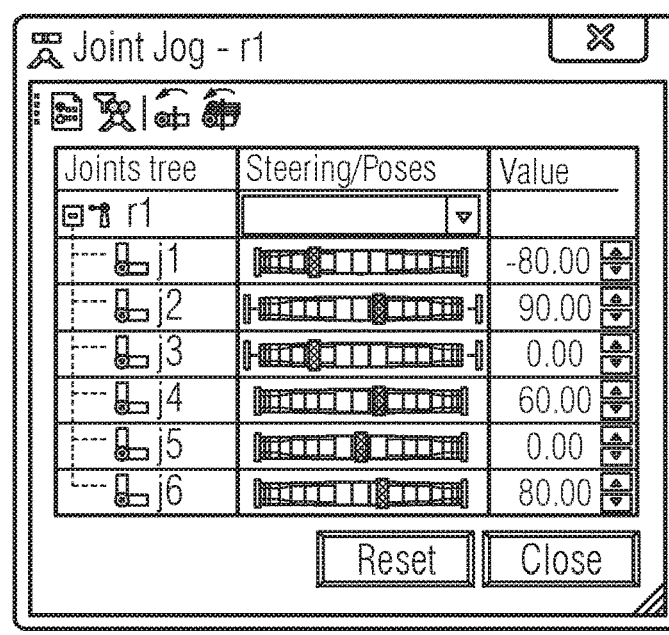
Figure 3:
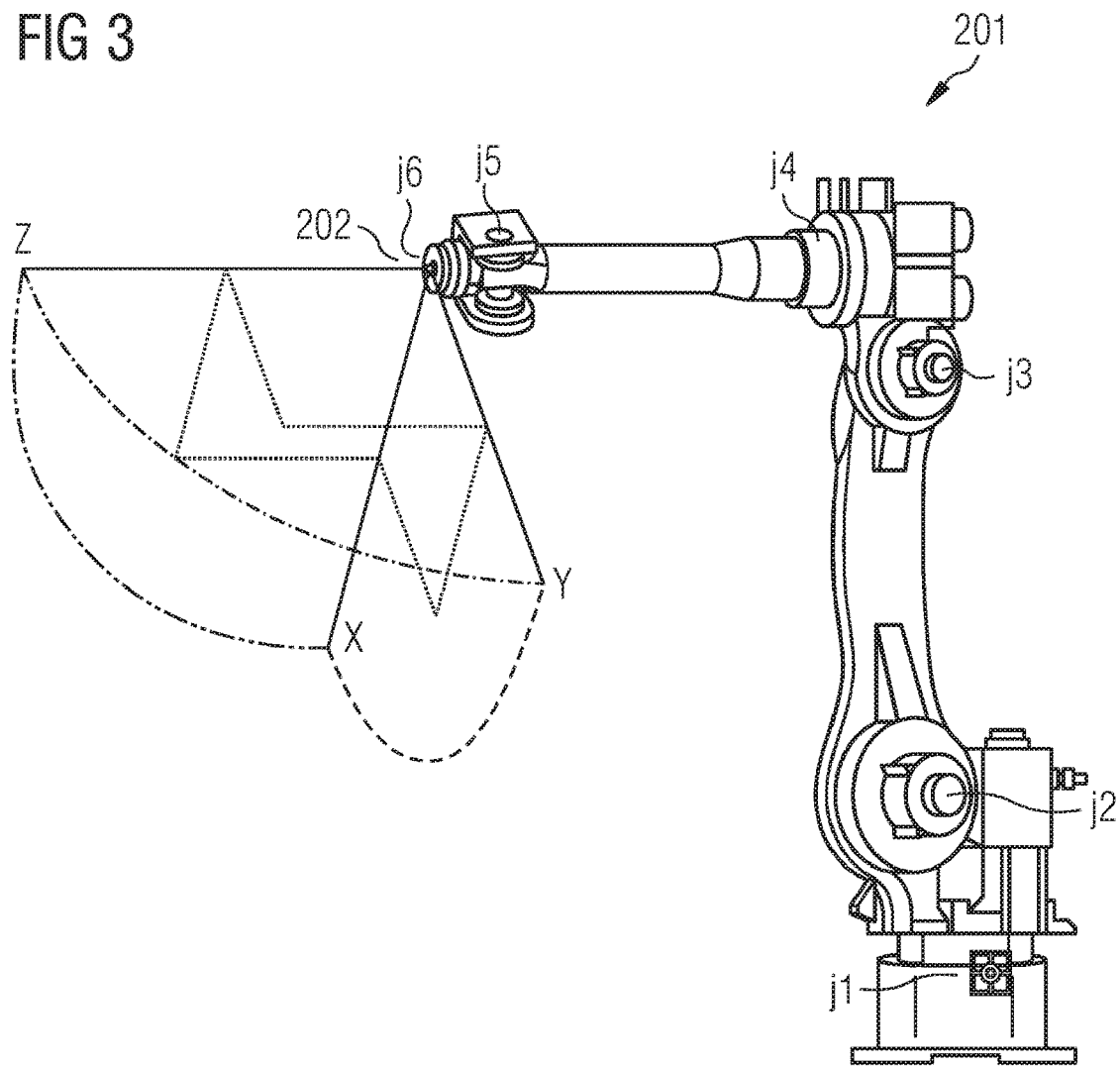
FIG. 3 schematically illustrates a drawing of a second exemplary case scenario of the robot with the singular target and a second joint value set.
Figure 3:
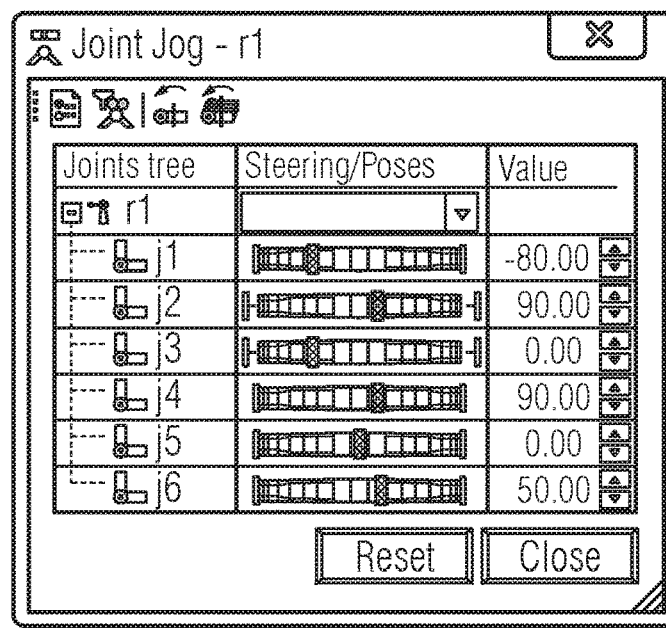

Typical well known singular solutions are the ones whereby the robot positions have the wrist joint equal to 0. For example, FIG. 2 and FIG. 3 show an exemplary scenario of a robot 201 having such type of wrist singularity. For the same singular target location 202, there are two possible different joint value solutions 203, 301 yielding to the same robot configuration. The first solution is shown in window 203 of FIG. 2 where the six joint values jv1, jv2, jv3, jv4, jv5 and jv6 are respectively equal to −80, 90, 0, 60, 0 and 80. The second solution is shown in window 301 of FIG. 3 where the six joint values jv1, jv2, jv3, jv4, jv5 and jv6 are respectively equal to −80, 90, 0, 90, 0 and 50.

As exemplified in FIGS. 2 and 3, when the wrist joint j5 has value 0, for each given value of joint j4, there is a corresponding given value of joint j6 which can compensate it so as to maintain the TCPF positioned on the same target location, and vice versa. The compensating rule is such that, for this example embodiment, jv4+jv6=(jv4+delta)+(jv6−delta) which is 140.

Figure 4:
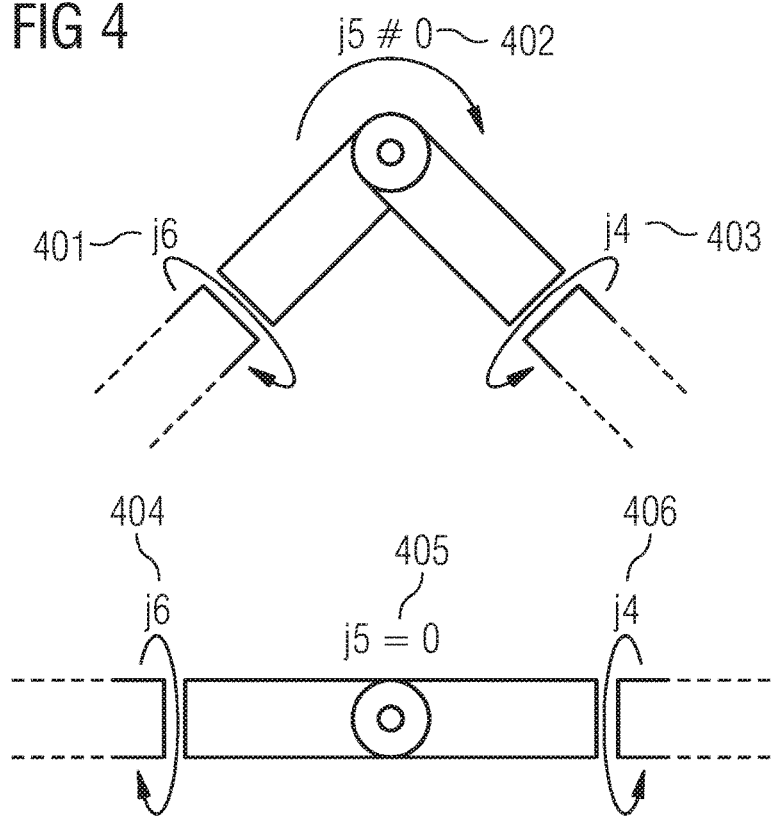
FIG. 4 schematically illustrates a drawing for schematically exemplifying a singularity in a robot arm.

FIG. 4 schematically illustrates a drawing exemplifying a robot arm without singularity (upper part) and with singularity (lower part). On the upper part of FIG. 4, it is shown a robot arm where there is no wrist singularity and joint j5 402 is different than 0. Therefore, joint j5 401 and joint j6 403 do not have values that can compensate each other and the robot configuration is univocally determined. In the lower part of FIG. 4, joint j5 405 is equal to 0 and a wrist singularity is present. For each value of joint j4 404 there is a corresponding value of joint j6 405 so that several joint-values solutions are possible for the same configuration of the robot.

Figure 5:
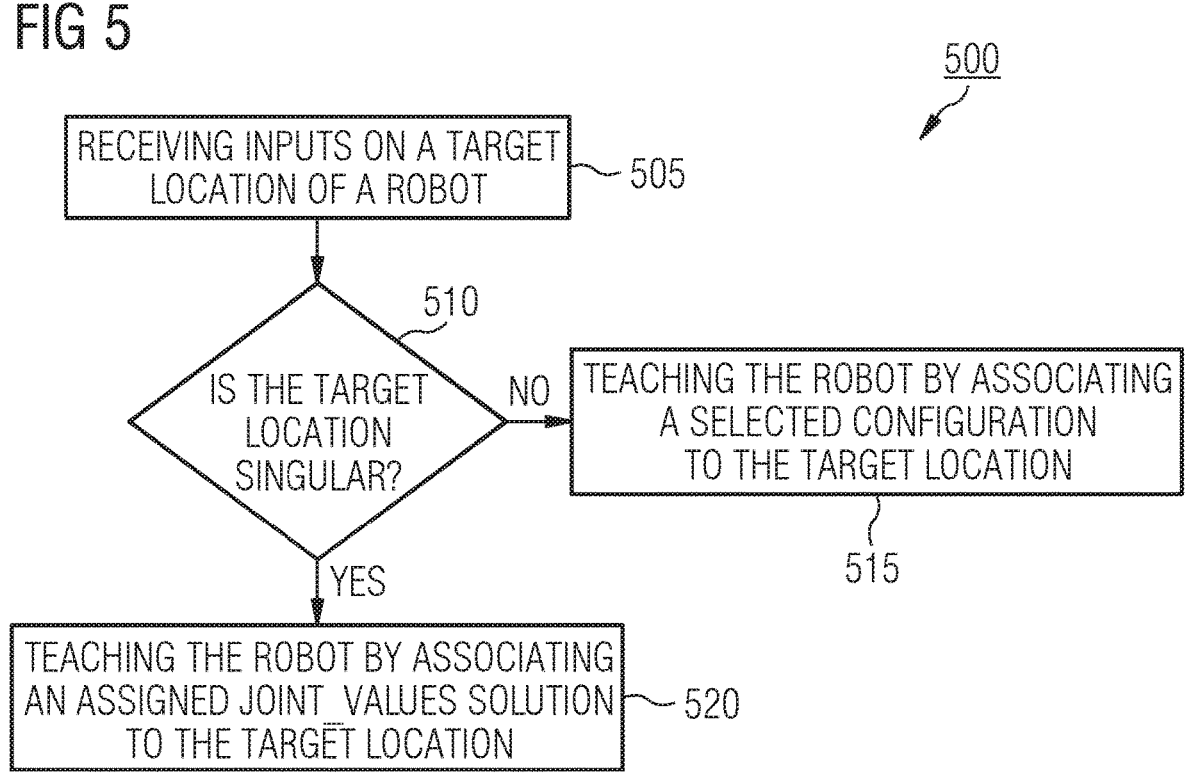
FIG. 5 schematically illustrates a flowchart for teaching a robot in teaching a given target in accordance with disclosed embodiments

FIG. 5 illustrates a flowchart 500 of a method for teaching a robot in reaching a given target in accordance with disclosed embodiments. Such method can be performed, for example, by system 100 of FIG. 1 described above, but the "system" in the process below can be any apparatus configured to perform a process as described.

At act 505, information inputs on a representation of a given target location of a robot are received.

At act 510, it is checked whether the given target location is singular or not.

If the given target is non-singular, at act 515, the robot is taught by associating a selected configuration to the given target location.

If the given target is singular, at act 520, the robot is taught by associating an assigned joint values solution to the given target location.

In embodiments, the representation of the given target location of act 505 may be in form of a joint value representation of the robot or in form of a geometrical representation of the target itself (e.g. Cartesian representation, e.g. x,y,z, ry,ry,rz).

If in act 505, the representation of the target location is a joint-values representation, in embodiments, the assigned joint-values solution of act 520 may be the received joint-values representation of the target location, e.g. as received through uploading of the physical robot program, or, in other embodiments, the assigned joint-values solution may be manually assigned by the user or it may be assigned in an automatic manner, e.g. at upload or via a predefined joint-values solution.

At act 510, the checking of a presence of a singularity is done for any available representation of the target. In embodiments where the target location of act 505 is represented in a Cartesian representation, then inverse kinematic calculation is preferably performed. Advantageously, in embodiments, in order to save computation time, one may preferably select the option of doing the check only for a set of selected singularities (e.g. wrist and/or elbow, etc.). In other embodiments, it is possible to select the option of checking all types of singularities.

Typically, in embodiments, in order to select the appropriate configuration, inverse kinematic calculations are used in act 515. In embodiments, only the selected configuration name it is saved without saving the corresponding joint values. In such a manner, the user may advantageously be enabled to perform small enhancements on the graphic location (having thus slightly different joint values) while still be able to use the same configuration selected before (e.g. elbow up, elbow down, etc. . . . ). In other embodiments, together with the selected configuration name also the corresponding joint values determined with inverse kinematics calculation are saved.

In embodiments, in case of a variation of a singular target location, the singularity of the new target location is checked again and, upon need, the assigned joint values solution is cleared and the teaching is then performed in a step-wise approach on the variation of the target location via inverse calculation.

Embodiments includes one or more of the below actions:
i) recognizing/identifying a singularity;

ii) uploading from a physical robotic program to a virtual robotic program;
iii) teaching a location;
iv) configuring a robot with a new target location after joint values clearing;
v) downloading from a virtual robotic program to a physical robotic program.

i) Identifying Singularities

A given target is to be identified as singular or non-singular. Singularity identification techniques are used whenever a target is checked for singularity. Such techniques may work on the geometrical representation of a target (e.g. via inverse kinematic simulation) or directly on the joint-values representation of a target. Examples of approaches includes, but are not limited to:

1) Select (e.g. using a User Interface or configuration file) which type/s of singularity is/are to be searched for (e.g. wrist singularity on j5, or elbow singularity). For singularities that are happening for specific joints and joints values, define the joint values that cause the singularity and the margin around such values. This approach can save performance, since it is not wasted time on checking irrelevant singularity types on each target.
2) In a target, all known singularities are checked one after the other. This approach is of easier usage, since the user does not have to define which singularity cases should be handled, but can have lower performances due to complex calculations.
3) In general, any technique which determines that at least one of robot configuration to reach the given target has more than one possible joint value solution.

ii) Uploading a Robotic Program

When reading joint values of a target from the physical robotic program, the upload process creates a Cartesian representation of the target, and saves the robot's configuration that will identify the solution that gives the joint values as they are in the original program. If the target is singular according to the check, the upload process saves also the joint values for the target.

iii) Teaching a Location

If the target location is non-singular, it is saved the robot's configuration of the selected solution for teaching the robot. Otherwise, if the target location is singular, in addition to the robot's configuration, it is saved also for the target the joint values of the robot's pose at the selected solution for teaching purposes. In embodiments, in case the target is non-singular, the selected solution is selected by picking the needed one among the list of solutions resulting from inverse kinematics calculation.

iv) Clearing of a Joint Values Solution

In embodiments, the joint values that are saved for teaching purposes may be cleared upon need in case of specific changes of the target location. In fact, if a target has joint values saved due to its singularity, and the target coordinates (e.g. x, y, z, rx, ry, rz) change, the singularity of the target may be evaluated again. If the target is no longer singular, or the saved joint values do not drive the robot to the target anymore, the saved joint values are preferably cleared. The clearing might be performed manually or automatically when the target coordinates change. Advantageously, in embodiments, it is possible to teach the target again. Alternatively, it is possible to split the motion into two sub-steps:

moving the robot forward to the saved joint values (the robot will reach the old target);
for the delta (from the new target), using regular inverse calculation.

This approach may advantageously compensate on small movements of the target and it is particularly convenient for the scenarios where 3D objects are rotated and relocated.

v) Downloading a Robotic Program

If the target is singular and has joint values saved for the solution, the download process writes these values to the physical robotic program. Otherwise, the joint values are calculated using inverse kinematics on the target coordinates (according to the selected configuration).

In embodiments, if the target location has a saved joint values solution because of a singularity, it is checked that the saved joint values solution drives the robot to the target location, and if this is the case, they are advantageously without the need to perform an inverse kinematics calculation to obtain the solution.

In previous techniques, there was a problem in uploading robot software for simulations. A typical task of a user in robotic simulation user is to upload an existing robotic program to an offline simulation environment in order to verify, validate and evaluate it. The robotic program comprises information on the robot joint values for each target location. In order to represent the targets in the simulation environment, so that they can later be manipulated, the upload process converts the joint values of each target to a 3D geometrical representation (x,y,z, rx, ry, rz). Also the configuration of the robot is associated for each converted target. The problem with this procedure was that in the case of singular targets for the robot, calculating inverse kinematics for the conversion results of the upload process, most of the time was yielding a different joint value series than the original joint values in original robotic program (even with the same configuration). As a results, the user unfortunately experienced that, for offline simulation products, the simulated robotic program containing singular targets was not matching the original physical robotic program which was uploaded, causing several inaccuracies for example in the calculations of cycle time and/or collisions with other equipment.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for teaching, by a data processing system, a robot in reaching a given target location, the method comprising:
   a) receiving information inputs on a representation of a given target location to be reached by the robot;
   b) checking whether or not the given target location is singular;
   c) if the given target location is non-singular, teaching the robot by associating a selected configuration with the given target location; and
   d) if the given target location is singular, teaching the robot by associating an assigned joint-values solution with the given target location.

2. The method according to claim 1, which comprises receiving the assigned joint-values solution through uploading of the robot program or providing the joint-values solution as a predefined solution that is manually or automatically assigned.

3. The method according to claim 1, wherein the representation of the given target location of step a) is a geometrical representation or a joint value representation of the corresponding robot configuration.

4. The method according to claim 3, wherein, if the target location is represented in a geometrical representation, the step of checking is effected after having performed inverse kinematic calculation.

5. The method according to claim 1, wherein the checking step b) comprises checking only on a selection of predefined singularities.

6. The method according to claim 1, wherein, in case of a variation of a singular target location, once more checking the singularity of a new target location and, if required, clearing the assigned joint values solution and performing the teaching in a step-wise approach on the variation of the target location via inverse calculation.

7. A data processing system, comprising:
a processor; and
an accessible memory; and
wherein the data processing system is configured to:
a) receive information inputs on a representation of a given target location to be reached by a robot;
b) check whether or not the given target location is singular;
c) if the given target location is non-singular, teach the robot by associating with the given target location a selected configuration; and
d) if the given target location is singular, teach the robot by associating with the given target location an assigned joint-values solution.

8. The data processing system according to claim 7, wherein the assigned joint-values solution is a solution contained in a robot program uploaded to the data processing system or the joint-values solution is a predefined solution assigned in a manual or in an automatic manner.

9. The data processing system according to claim 7, wherein the representation of the given target location in a) is a geometrical representation or a joint value representation of a corresponding robot configuration.

10. The data processing system according to claim 7, wherein, if the target location is represented in a geometrical representation, the singular checking of b) is effected after having performed inverse kinematic calculation.

11. The data processing system according to claim 7, wherein the singular checking of b) is effected only on a selection of predefined singularities.

12. The data processing system according to claim 7, wherein the data processing system is configured, in case of a variation of a singular target location, to check the singularity of the new target location again and, upon need, clearing the assigned joint values solution and to teach the robot in a step-wise approach on the variation of the target location via inverse calculation.

13. A non-transitory computer-readable medium encoded with executable instructions that, when executed, cause one or more data processing systems to:
a) receive information inputs on a representation of a given target location to be reached by a robot;
b) check whether or not the given target location is singular;
c) if the given target location is non-singular, teach the robot by associating with the given target location a selected configuration; and
d) if the given target is singular, teach the robot by associating with the given target location an assigned joint-values solution.

14. The non-transitory computer-readable medium according to claim 13, wherein the assigned joint-values solution is received through uploading of the robot program or the joint-values solution is a predefined solution that is manually or automatically assigned.

15. The non-transitory computer-readable medium according to claim 13, wherein the representation of the given target location of item a) is a geometrical representation or a joint value representation of the corresponding robot configuration.

16. The non-transitory computer-readable medium according to claim 15, wherein, when the target location is represented in a geometrical representation, checking for the target singularity in item b) after having performed inverse kinematic calculation.

17. The non-transitory computer-readable medium according to claim 13, wherein the data processing system is configured to check for the target singularity in item b) only on a selection of predefined singularities.

18. The non-transitory computer-readable medium according to claim 13, wherein, on occasion of a variation of a singular target location, checking the singularity of the new target location again and, upon need, clearing the assigned joint-values solution and causing the teaching to be performed in a step-wise approach on the variation of the target location via inverse calculation.

* * * * *